US010920849B2

(12) United States Patent
Nakakubo et al.

(10) Patent No.: US 10,920,849 B2
(45) Date of Patent: Feb. 16, 2021

(54) DAMPING MEMBER FOR ROLLING GUIDE DEVICE AND SEISMIC ISOLATION STRUCTURE UTILIZING SAME

(71) Applicant: THK CO., LTD., Tokyo (JP)

(72) Inventors: Keisuke Nakakubo, Tokyo (JP); Junichi Washida, Tokyo (JP); Tetsuya Fukumoto, Tokyo (JP); Noriaki Chikamoto, Tokyo (JP); Tadashi Nakano, Tokyo (JP)

(73) Assignee: THK CO., LTD., Tokyo (JP)

( * ) Notice: Subject to any disclaimer, the term of this patent is extended or adjusted under 35 U.S.C. 154(b) by 11 days.

(21) Appl. No.: 16/490,330

(22) PCT Filed: Feb. 15, 2018

(86) PCT No.: PCT/JP2018/005181
§ 371 (c)(1),
(2) Date: Aug. 30, 2019

(87) PCT Pub. No.: WO2018/159301
PCT Pub. Date: Sep. 7, 2018

(65) Prior Publication Data
US 2020/0408275 A1 Dec. 31, 2020

(30) Foreign Application Priority Data
Mar. 3, 2017 (JP) .............................. JP2017-040340

(51) Int. Cl.
*F16C 29/04* (2006.01)
*F16F 15/04* (2006.01)
(Continued)

(52) U.S. Cl.
CPC ............ *F16F 15/04* (2013.01); *F16C 29/008* (2013.01); *F16C 29/004* (2013.01); *F16C 29/005* (2013.01); *F16F 7/108* (2013.01)

(58) Field of Classification Search
CPC .... F16C 29/002; F16C 29/004; F16C 29/008; F16C 29/06; F16C 29/0633;
(Continued)

(56) References Cited

U.S. PATENT DOCUMENTS 5,268,970 A    12/1993   Tanaka
5,732,799 A   *   3/1998   Chikamatsu et al. ... B23Q 1/28
                                                             188/67

(Continued)

FOREIGN PATENT DOCUMENTS

JP         4-17511 U      2/1992
JP         4-28217 U      3/1992

(Continued)

OTHER PUBLICATIONS

International Search Report dated Mar. 27, 2018, issued in counterpart International Application No. PCT/JP2018/005181 (2 pages).

(Continued)

*Primary Examiner* — Phillip A Johnson
(74) *Attorney, Agent, or Firm* — Westerman, Hattori, Daniels & Adrian, LLP

(57) ABSTRACT

Provided is a damping member which can be easily mounted to a rolling guide device already in use, can avoid an increase in size of the rolling guide device, and can easily enhance a damping force in an axial direction exerted by the rolling guide device. The damping member is applied to the rolling guide device in which a moving block is assembled to a track rail through intermediation of a plurality of rolling elements, is provided to the track rail in series with the moving block, and includes: a friction member which includes a sliding contact pad in contact with at least the track rail; and a fixing holder, which includes a holding portion configured to cover the friction member so as to press the sliding contact pad against the track rail, and is (Continued)

configured to couple the friction member to the moving block.

4 Claims, 6 Drawing Sheets

(51) Int. Cl.
*F16C 29/00* (2006.01)
*F16F 7/108* (2006.01)

(58) Field of Classification Search
CPC .............. F16C 29/0635; F16C 29/0652; F16C 29/0669; F16F 7/08; F16F 15/04; E04H 9/023
See application file for complete search history.

(56) References Cited

U.S. PATENT DOCUMENTS 6,085,473 A * 7/2000 Teramachi et al. ....... E04H 9/02
52/167.5
8,282,282 B2 * 10/2012 Michioka ............ F16C 29/0669
384/45
2001/0016087 A1 * 8/2001 Akiyama et al. ....... F16C 29/06
384/17
2015/0063730 A1 * 3/2015 Sakai ...................... F16C 29/02
384/26

FOREIGN PATENT DOCUMENTS

| JP | 05149332 A * | 6/1993 | .......... F16C 29/0633 |
| JP | 9-217743 A | 8/1997 | |
| JP | 10-47345 A | 2/1998 | |
| JP | 11-159188 A | 6/1999 | |
| JP | 2000-240719 A | 9/2000 | |
| JP | 2001-280413 A | 10/2001 | |
| JP | 2006-153210 A | 6/2006 | |

OTHER PUBLICATIONS

Decision to Grant a Patent dated Oct. 9, 2018, issued in counterpart of Japanese Patent Application No. 2017-40340 with English Translation (6 pages).
Notification of Reasons for Refusal dated May 29, 2018, issued in counterpart of Japanese Patent Application No. 2017-40340 with English Translation (12 pages).

* cited by examiner

DAMPING MEMBER FOR ROLLING GUIDE DEVICE AND SEISMIC ISOLATION STRUCTURE UTILIZING SAME

TECHNICAL FIELD

The present invention relates to a damping member, which is applied to a rolling guide device including a track rail and a moving block configured to move along the track rail to easily increase a damping force acting against movement of the moving block, and relates to a seismic isolation device using the damping member.

BACKGROUND ART

A rolling guide device includes a track rail and a moving block assembled to the track rail through intermediation of a plurality of rolling elements. The moving block and the track rail are relatively movable while bearing a load acting thereon from an outside, and the rolling guide device is used for a wide variety of applications such as machine tools and conveyors.

Further, a seismic isolation device is known as another application of the rolling guide device. The seismic isolation device is provided between a structure such as a building and a ground, or between an article such as a precision device, an electronic device, or an art object provided in a building and a floor, and is used for the purpose of isolating the seismic isolation object from vibration of the ground or the floor. For example, in the seismic isolation device used for the building, the rolling guide device is provided between a lower table fixed to the floor and an upper table having the article placed thereon. When vibration acts on the floor, the moving block moves relative to the track rail, to thereby isolate the upper table having the seismic isolation object placed thereon from the vibration of the floor and set a vibration cycle of the upper table to be sufficiently long, thereby being capable of alleviating shaking of the seismic isolation object.

An essential feature of the rolling guide device of this type is that the moving block easily moves relative to the track rail with small sliding resistance. Therefore, in the seismic isolation device using the rolling guide device, there is a fear in that the upper table is shaken relative to the lower table even when slight vibration is applied. Further, the rolling guide device does not exert any damping force with respect to movement of the track rail in a longitudinal direction (hereinafter, referred to as "axial direction"). Therefore, there is a fear in that, when vibration having large acceleration such as a strong earthquake is applied, the upper table is shaken for a long period of time with a large stroke.

As a measure to enable the rolling guide device to impart the damping force in the axial direction, for example, there has been known a brake unit disclosed in Patent Literature 1. The brake unit includes brake shoes and resilient bag members. The brake shoes are configured to come into contact with side surfaces of the track rail. The resilient bag members are configured to press the brake shoes against the track rail in accordance with pressure of pressurized air. The brake unit is assembled to the track rail together with the moving block. The elastic bag members are inflated with the pressurized air so that friction resistance between the brake shoes and the track rail can be appropriately increased or reduced, thereby being capable of imparting a damping force having a suitable magnitude against the movement of the rolling guide device in the axial direction.

CITATION LIST

Patent Literature

[PTL 1] JP 9-217743 A

DISCLOSURE OF THE INVENTION

Problems to be Solved by the Invention

However, the brake unit disclosed in Patent Literature 1 requires the pressurized air for operation, and hence it is difficult to downsize the braking unit. For example, when the brake unit is applied to a seismic isolation device, there is a fear in that an overall size of the entire device is increased. Further, when the seismic isolation device is reduced in thickness, a space between the lower table and the upper table becomes significantly narrower. Therefore, it becomes also difficult to provide the brake unit in the space.

Further, in recent years, as a countermeasure against strong earthquakes, there is a case in which enhancement in damping force of a seismic isolation device already being in use is required. In such a case, it is convenient when sliding contact resistance of the rolling guide device in the axial direction can be easily increased without disassembly of the seismic isolation device.

Means for Solving the Problems

The present invention has been made in view of such a problem, and has an object to provide a damping member which can be easily mounted to a rolling guide device already being in use, can avoid an increase in size of the rolling guide device, and can easily enhance a damping force in the axial direction exerted by the rolling guide device.

Further, another object of the present invention is to provide a seismic isolation device, which has the damping member mounted thereto so as to have appropriate static stiffness and is capable of damping input vibration energy in an early stage.

That is, the present invention relates to a damping member to be applied to a rolling guide device, and the rolling guide device includes: a track rail; and a moving block, which is assembled to the track rail through intermediation of a plurality of rolling elements, and is configured to move along the track rail. The damping member is provided to the track rail in series with the moving block, and includes: a friction member which includes a sliding contact pad in contact with at least the track rail; and a fixing holder, which includes a holding portion configured to cover the friction member so as to press the sliding contact pad against the track rail, and is configured to couple the friction member to the moving block.

Further, a seismic isolation device according to the present invention includes: a lower table mounted to a fixing portion; an upper table having a seismic isolation object placed thereon; a first track rail provided to the lower table so as to extend along an X-direction; a second track rail provided to the upper table so as to extend along a Y-direction orthogonal to the X-direction; a composite guide member assembled to the first track rail and the second track rail through intermediation of a plurality of rolling elements; and a damping member provided to each of the first track rail and the second track rail in series with the composite guide member. The damping member includes: a friction member which includes contact pads in contact with at least one of the first track rail and the second track rail; and a fixing holder, which includes a holding portion configured to cover the friction member so as to press the sliding contact pads against the first track rail or the second track rail, and is configured to couple the friction member to the composite guide member.

Effects of the Invention

Such a damping member of the present invention can be easily mounted to a rolling guide device already being in use, can avoid an increase in size of the rolling guide device, and can easily enhance a damping force in the axial direction exerted by the rolling guide device.

Further, a seismic isolation device, which has the damping member of the present invention applied thereto, has appropriate static stiffness, and is capable of damping input vibration energy in an early stage.

MODE FOR CARRYING OUT THE INVENTION

Now, with reference to the accompanying drawings, detailed description is given of a damping member and a seismic isolation device using the damping member according to the present invention.

Figure 1:
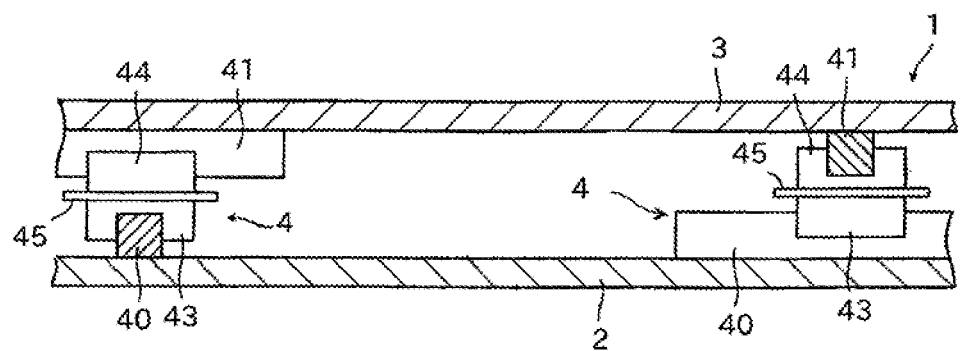
FIG. 1 is a front sectional view for schematically illustrating a seismic isolation device to which the present invention is applied.

FIG. 1 is a front sectional view for illustrating an example of a seismic isolation device to which the damping member of the present invention is applicable. The seismic isolation device 1 is provided in, for example, a building, and is used for the purpose of protecting a seismic isolation object such as a precision device, an electronic device, or an art object from earthquakes. The seismic isolation device 1 includes a lower table 2, an upper table 3, and a cross guide section 4. The lower table 2 is provided on a floor of the building. The upper table 3 has the seismic isolation object placed thereon. The cross guide section 4 is configured to freely move the upper table 3 relative to the lower table 2 in an X-direction and a Y-direction orthogonal to the X-direction (depth direction in the drawing sheet of FIG. 1).

Figure 2:
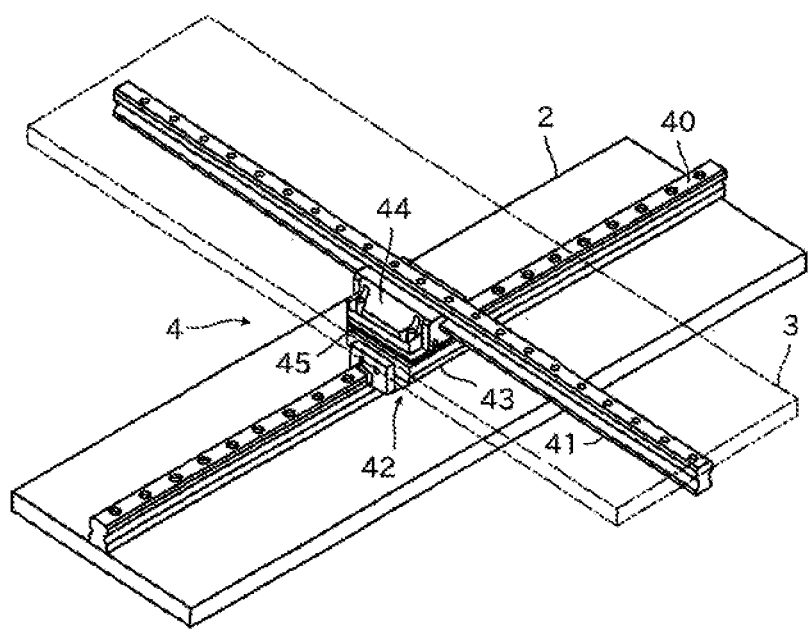
FIG. 2 is a perspective view for illustrating an example of a cross guide section which can be used for the seismic isolation device illustrated in FIG. 1.

FIG. 2 is a view for illustrating a specific configuration of the cross guide section 4. The cross guide section 4 includes a first track rail 40, a second track rail 41, and a composite guide member 42. The first track rail 40 is provided on the lower table 2. The second track rail 41 is fixed to a lower surface side of the upper table 3 so as to extend along a direction orthogonal to the first track rail. The composite guide member 42 is configured to move along both of the first track rail 40 and the second track rail 41. Further, the composite guide member 42 includes a first moving block 43, a second moving block 44, and a coupling plate 45. The first moving block 43 is assembled to the first track rail 40 through intermediation of a plurality of rolling elements. The second moving block 44 is assembled to the second track rail 41 through intermediation of a plurality of rolling elements. The coupling plate 45 is configured to integrate the first moving block 43 and the second moving block 44 with each other on respective back surfaces.

A combination of the first track rail 40 and the first moving block and a combination of the second track rail 41 and the second moving block 44 each form a rolling guide device to which the damping member of the present invention is applicable.

A plurality of rolling surfaces for the rolling elements are formed on each of the first track rail 40 and the second track rail 41 along the longitudinal direction. Meanwhile, the first moving block 43 and the second moving block 44 each have a plurality of rolling elements which roll on the rolling surfaces so as to endlessly circulate. The first moving block 43 freely moves along the first track rail 40, and the second moving block 44 freely moves along the second track rail 41. Further, the first moving block 43 is inseparably assembled to the first track rail 40, and the second moving block 44 is inseparably assembled to the second track rail 41, respectively.

In a case in which the longitudinal direction of the first track rail 40 is regarded as the X-direction, the composite guide member 42, which includes the first moving block 43 and the second moving block 44 integrated with each other, is freely movable in the X-direction along the first track rail 40, and the second track rail 41 having the second moving block 44 assembled thereto is freely movable in the Y-direction orthogonal to the X-direction relative to the composite guide member. Accordingly, the upper table 3 having the second track rail 41 fixed thereto, is freely movable in the X-direction and the Y-direction relative to the lower table 2.

Further, the composite guide member 42 is not separable from the first track rail 40 and the second track rail 41. For example, even when the upper table 3 receives a load in a direction of lifting the upper table 3 from the lower table 2, that is, a floating load is applied to the upper table 3, the cross guide section 4 can freely guide the upper table 3 in the X-direction and the Y-direction while bearing the floating load. Withstand loads of the first moving block 43 and the second moving block 44 can be suitably selected in accordance with a weight of the seismic isolation object to be mounted to the upper table 3.

Figure 3:
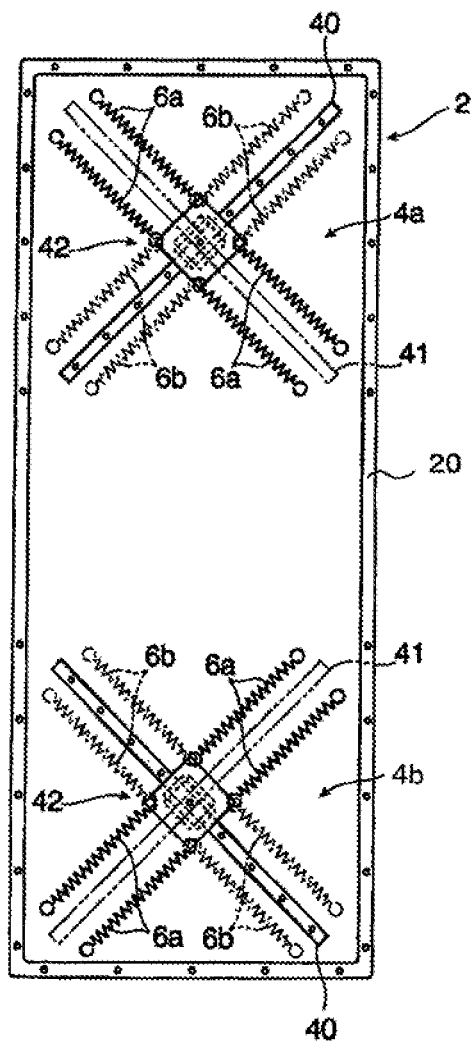
FIG. 3 is a plan view for illustrating a configuration of a lower table of the seismic isolation device illustrated in FIG. 1.

FIG. 3 is an illustration of an example of the seismic isolation device 1 according to the embodiment, and is a plan view for illustrating a state in which second moving blocks 44 are separated from coupling plates 45, and the upper table 3 is removed from the lower table 2. The lower table 2 is formed to have a rectangular shape, and a flange portion 20 is provided on four sides of the lower table 2 to increase strength of the lower table 2. The flange portion 20 may have bolt mounting holes, which can be used for connection to another seismic isolation device.

Two cross guide sections 4a and 4b are provided on the lower table 2. The first track rail 40 of each of the cross guide sections 4a and 4b is provided on the lower table 2 so as to form an angle of 45 degrees with each side of the lower table 2. Further, the first track rail 40 of the one cross guide section 4a and the first track rail 40 of another cross guide section 4b are arranged in different orientations at 90 degrees. Still further, the second track rails 41 to be fixed to the upper table 3 are provided to be orthogonal to the first track rails 40. For reference, the second track rails 41 are illustrated by one dot chain lines in FIG. 3.

Further, a plurality of lower elastic members 6a formed of coil springs are provided between the coupling plate 45 and the lower table 2. A longitudinal direction of each lower elastic member 6a matches a direction orthogonal to the first track rail 40, and the lower elastic member 6a is stretched so that a tension is reduced most when the composite guide member 42 is positioned at a center position of the first track rail 40 in the longitudinal direction. Therefore, the lower elastic member 6a expands and contracts as the composite guide member 42 move along the first track rail 40, and exert a pulling force to pull back the composite guide member 42 to the center position of the first track rail 40 in the longitudinal direction.

Meanwhile, the upper table 3 having the second track rail 41 of the cross guide section 4 fixed thereto has the same shape as the lower table 2 described above, and is stacked on the lower table 2 illustrated in FIG. 3 through intermediation of the cross guide section 4. As indicated by the one dot chain lines in FIG. 3, the second track rails 41 are orthogonal to the first track rails 40, and the composite guide members 42 are positioned at intersections between the second track rails 41 and the first track rails 40.

Further, a plurality of upper elastic members 6b formed of coil springs are provided between the coupling plate 45 and the upper table 3. A longitudinal direction of each upper elastic member 6b matches a direction orthogonal to the second track rail 41, and, the upper elastic member 6b is stretched so that a tension is reduced most when the composite guide member 42 is positioned at a center position of the second track rail 41 in the longitudinal direction. Therefore, the upper elastic member 6b expands and contracts as the second track rail 41 moves relative to the composite guide member 42, and exert a pulling force against the upper table 3 such that the composite guide member 42 is positioned at center of the second track rails 41 in the longitudinal direction.

Thus, the seismic isolation device 1 forms a vibration system by actions of the cross guide sections 4, the lower elastic members 6a, and the upper elastic members 6b. When vibration is applied from a floor to the lower table 2 mounted to the floor, the upper table 3 can freely vibrate in the X-direction and the Y-direction in a cycle different from that of the lower table 2.

In the example illustrated in FIG. 3, two lower elastic members 6a are provided on both sides of the first track rail 40, and two upper elastic members 6b are provided on both sides of the second track rail 41. However, the number of the elastic members 6a and 6b may be appropriately changed in consideration of a weight of a seismic isolation object to be placed on the upper table 3, or movement resistance of the composite guide member 42 with respect to the first track rail 40 and the second track rail 41.

Figure 4:
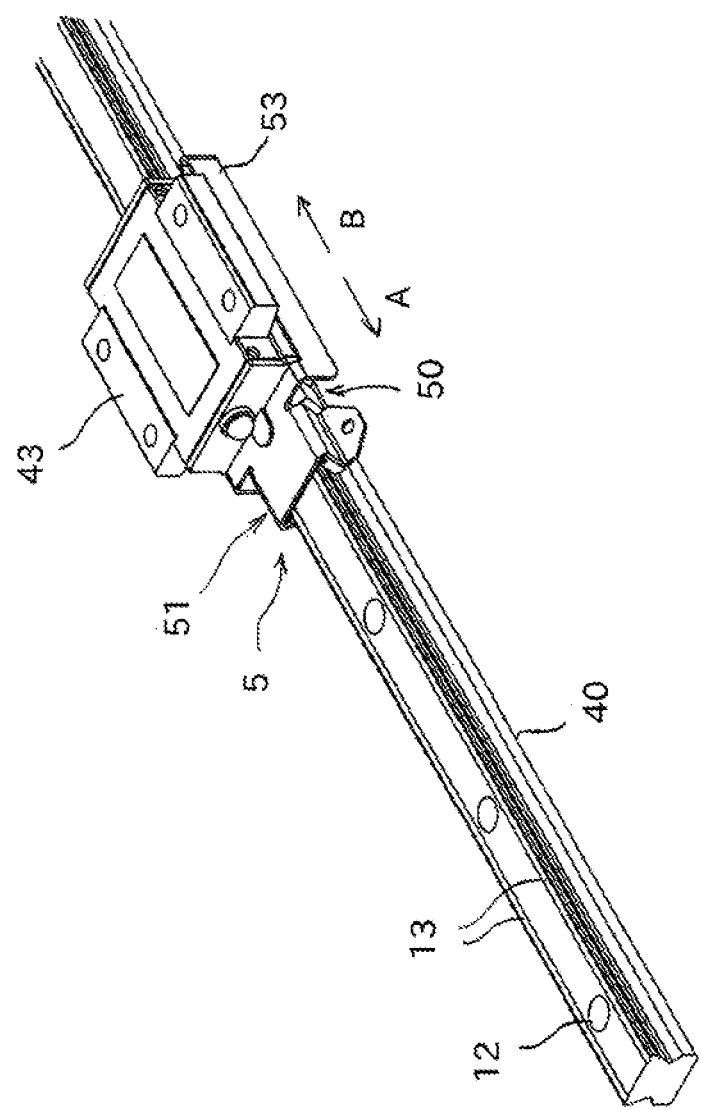
FIG. 4 is a perspective view for illustrating an example of a rolling guide device having a damping member of the present invention mounted thereto.

FIG. 4 is a view for illustrating an example of the rolling guide device as a combination of the first track rail 40 and the first moving block 43, and a damping member according to the present invention is mounted to the rolling guide device. A combination of the second track rail 41 and the second moving block 44 is also the same as the combination of the first track rail 40 and the first moving block 43. Therefore, in the following description, the first track rail 40 and the second track rail 41 are referred to as "track rail 40" without being distinguished, and the first moving block 43 and the second moving block 44 are referred to as "moving block 43" being distinguished.

The rolling guide device includes the track rail 40, the moving block 43, and a damping member 5. The track rail 40 extends linearly. The moving block 43 is assembled to the track rail 40 through intermediation of a plurality of rolling elements such as balls or rollers. The damping member 5 is mounted to the moving block 43. While the track rail 40 is provided on fixing portions of various mechanical devices, various movable bodies, which are objects to be conveyed, are mounted to the moving block 43. The moving block 43 moves along the track rail 40 so that the movable bodies can be reciprocally and freely guided on the fixing portions.

The track rail 40 is formed into an elongated body having a substantially rectangular sectional shape. The track rail 40 has a plurality of bolt mounting holes 12. The bolt mounting holes 12 are formed at predetermined intervals in the longitudinal direction therebetween and pass through the track rail 40 from an upper surface to a bottom surface of the track rail 40. With use of fixing bolts inserted into the bolt mounting holes 12, the track rail 40 can be firmly fixed to the fixing portions. A plurality of rolling surfaces 13 for the rolling elements are formed on the track rail 40.

Meanwhile, the moving block 43 includes a plurality of endless circulation paths in which the plurality of rolling elements circulate, and the endless circulation paths correspond to rolling surfaces 13 of the track rail 40, respectively. The plurality of rolling elements roll while bearing a load between the track rail 40 and the moving block 43, thereby allowing the moving block 43 to freely move along the longitudinal direction of the track rail 40 with slight sliding contact resistance.

Figure 5:
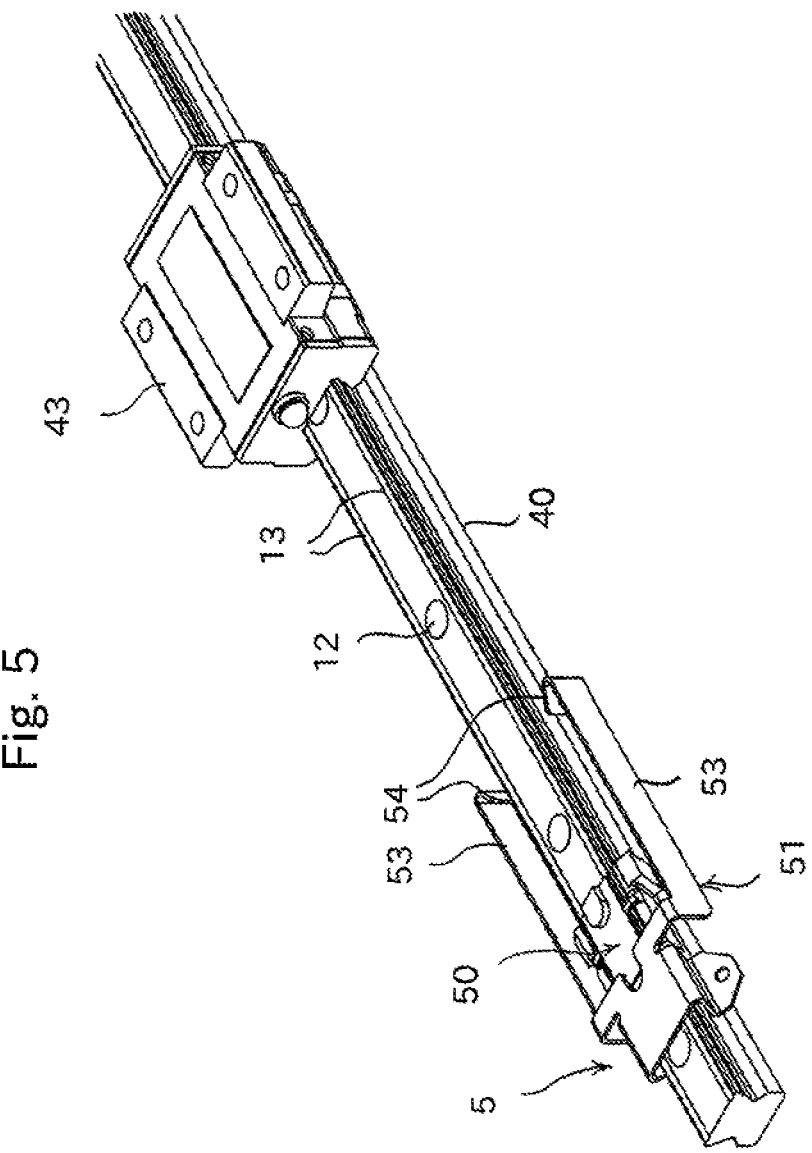
FIG. 5 is a perspective view for illustrating a state in which a moving block of the rolling guide device and the damping member are separated from each other.

FIG. 5 is a perspective view for illustrating a state in which the damping member 5 is separated from the moving block 43. The damping member 5 includes a friction member 50 and a fixing holder 51. The friction member 50 is in contact with the track rail 40. The fixing holder 51 is configured to press the friction member 50 against the track rail 40, and integrates the friction member 50 with the moving block 43. The damping member 5 moves along the track rail 40 together with the moving block 43, and the friction member 50 is held in sliding contact with the track rail 40 so that a resistance force in a direction to hold back the movement of the moving block 43 is exerted.

Figure 6:
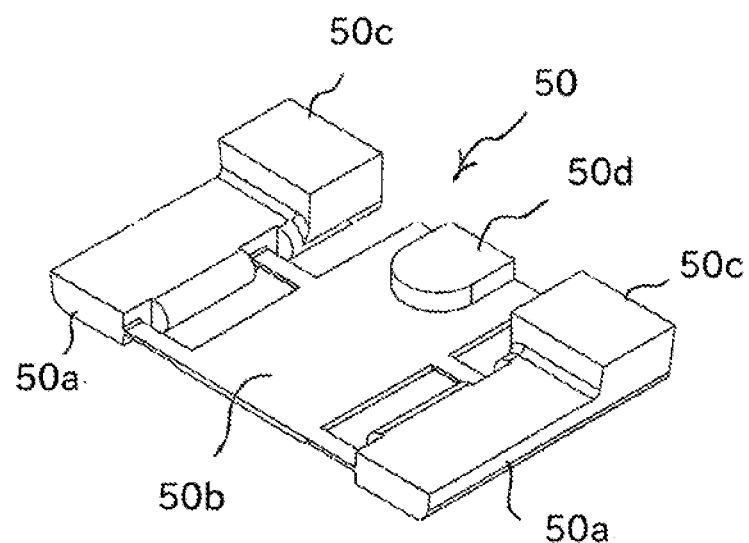
FIG. 6 is a perspective view for illustrating a friction member to be used for the damping member illustrated in FIG. 5.

FIG. 6 is a view for illustrating the friction member 50. The friction member 50 includes a pair of sliding contact pads 50a to be in contact with the both side surfaces of the track rail 40, and a pressure receiving plate 50b to be in contact with an upper surface of the track rail 40 having the bolt mounting holes 12. The sliding contact pads 50a and the pressure receiving plate 50b are coupled to each other by strip portions, and are integrally formed by injection molding of a synthetic resin. The strip portions are freely bendable. Through bending of the strip portions, an inclination angle of each sliding contact pad 50a relative to the pressure receiving plate 50b is freely changed, thereby being capable of accurately bringing the pair of sliding contact pads 50a into contact with the side surface of the track rail 40. FIG. 6 is a view for illustrating a developed state of the friction member 50. When the friction member 50 is actually mounted to the track rail 40, the pair of sliding contact pads

50a is used to be bent downward such that the sliding contact pads 50a correspond to the side surfaces of the track rail 40. In the friction member 50 illustrated in FIG. 6, the pair of sliding contact pads 50a is integrally molded through intermediation of the pressure receiving plate 50b, but each sliding contact pad 50a may be molded separately.

Figure 7:
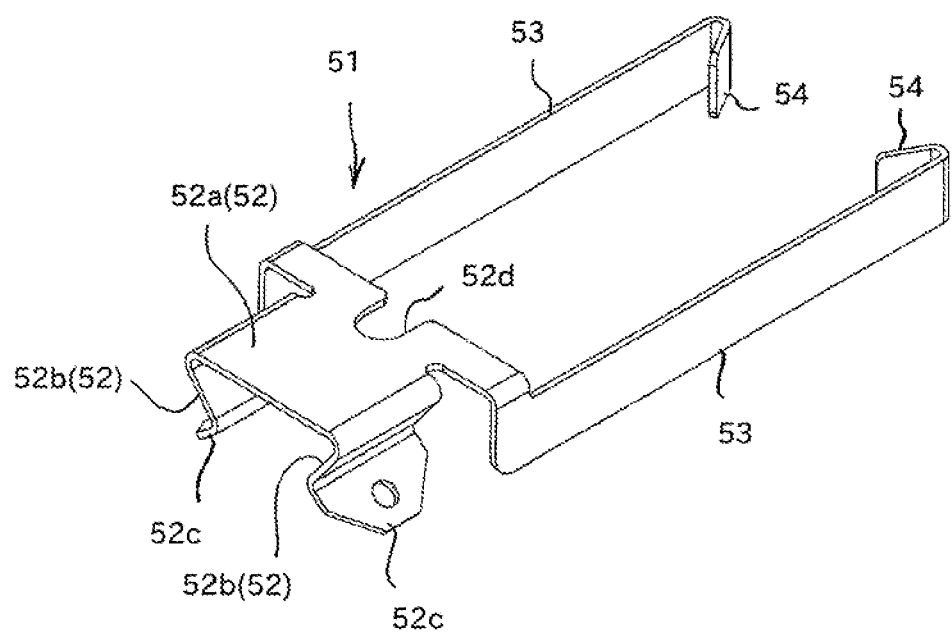
FIG. 7 is a perspective view for illustrating a fixing holder to be used for the damping member illustrated in FIG. 5.

Meanwhile, FIG. 7 is a view for illustrating the fixing holder 51. The fixing holder 51 is formed by bending a thin metal plate, and includes a holding portion 52 which covers the track rail 40 from above the friction member 50. The holding portion 52 includes a base plate 52a and a pair of pressing plates 52b. The base plate 52a is provided to overlap the pressure receiving plate 50b of the friction member 50. The pair of pressing plates 52b is bent from the base plate 52a and is configured to press the sliding contact pads 50a against the side surfaces of the track rail 40. The pair of pressing plates 52b acts as plate springs, and sandwiches the track rail 40 to cause the pair of sliding contact pads 50a to be pressed against the side surfaces of the track rail. Flange portions 52c, which are folded back outward, are provided at distal ends of the pressing plate 52b. The flange portions 52c are used as engagement portions for a jig when the holding portion 52 covers the track rail 40.

Further, the fixing holder 51 includes a pair of coupling arms 53 extending from the holding portion 52. The coupling arms 53 extend in the longitudinal direction of the track rail 40, and a distance between the pair of coupling arms 53 corresponds to a width of the moving block 43. Still further, the pair of coupling arms 53 has flexibility as plate springs, and locking claws 54, which are formed by the coupling arms 53 folded back inward, are provided at distal ends of these coupling arms 53.

Therefore, in the state illustrated in FIG. 5, that is, in the state in which the fixing holder 51 is mounted to the track rail 40 from above the friction member 50, when the moving block 43 moves toward the fixing holder 51, the locking claws 54 are brought into contact with the moving block 43 to push the pair of coupling arms 53 outward, with the result that the moving block 43 is received between the pair of coupling arms 53. The pair of coupling arms 53 has flexibility so that, when the locking claws 54 pass through the moving block 43, the locking claws 54 are caught on an end surface of the moving block 43, and the pair of coupling arms is brought into a state of holding the moving block. Thus, the fixing holder 51 and the moving block 43 are integrated as illustrated in FIG. 4. The fixing holder 51 can couple the moving block 43 from any one of a front and a back in a moving direction of the moving block 43 with respect to the track rail 40.

When the moving block 43 moves in a direction toward the damping member 5 (arrow A-direction illustrated in FIG. 4) on the track rail 40, the fixing holder is pressed by the moving block to move on the track rail. Meanwhile, when the moving block 43 moves in a direction opposite to the damping member 5 (arrow B-direction illustrated in FIG. 4) on the track rail 40, the fixing holder 51 is pulled by the moving block 43 through intermediation of the pair of coupling arms 53 to move on the track rail 40.

Meanwhile, as illustrated in FIG. 6, one end of each sliding contact pad 50a of the friction member 50 includes a thick portion 50c, and the thick portion 50c is positioned between the pressing plate 52b of the fixing holder 51 and the moving block 43 in the longitudinal direction of the track rail 40. Therefore, when the moving block 43 moves in the direction toward the damping member 5 (arrow A-direction illustrated in FIG. 4) along the track rail 40, the moving block 43 presses the fixing holder 51 through intermediation of the thick portion 50c, and hence each sliding contact pad 50a moves in the arrow A-direction together with the fixing holder 51 on the track rail 40. Meanwhile, when the moving block 43 moves in the direction opposite to the damping member 5 (arrow B-direction illustrated in FIG. 4) on the track rail 40, the fixing holder 51 pulled by the moving block presses the thick portion 50c, and each sliding contact pad 50a moves in the arrow B-direction together with the fixing holder 51 on the track rail 40.

Further, the pressure receiving plate 50b of the friction member 50 includes a positioning protrusion 50d, and a notch portion 52d having the positioning protrusion 50d fitted thereto is formed in the base plate 52a of the fixing holder 51. The positioning protrusion 50d functions as the thick portion 50c of the sliding contact pads 50a. When the moving block 43 moves along the track rail 40, the positioning protrusion 50d is pressed by the moving block or the fixing holder to push and pull the pressure receiving plate 50b of the friction member along the track rail.

Therefore, in the damping member 5 illustrated in FIG. 5, as long as the holding portion 52 of the fixing holder 51 covers the friction member 50, the friction member 50 can be in sliding contact with the track rail 40 in accordance with movement of the moving block 43, and hence the friction member 50 and the fixing holder 51 can be integrated with a simple configuration.

Figure 8:
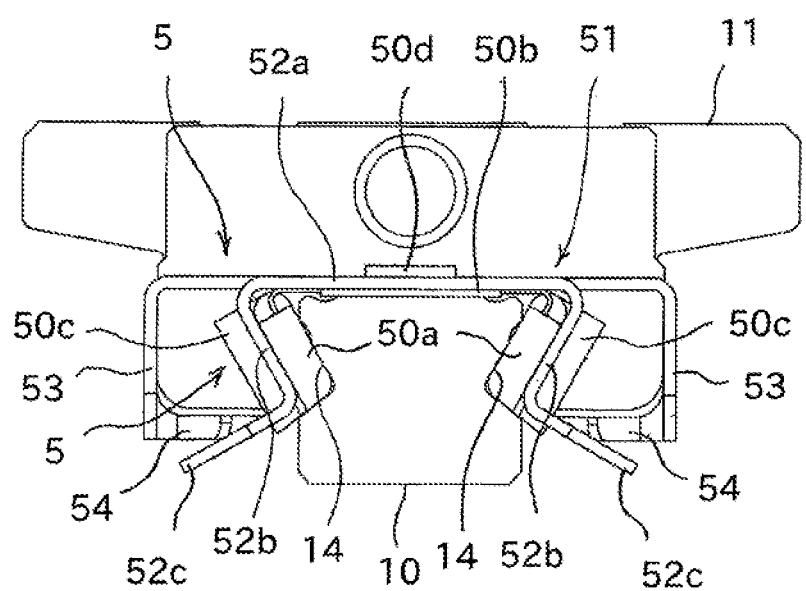
FIG. 8 is a front view for illustrating the rolling guide device illustrated in FIG. 4 as viewed from a longitudinal direction of a track rail.

FIG. 8 is a front view of the moving block 43 having the damping member 5 mounted thereto as viewed from the longitudinal direction of the track rail 40. In the illustrated rolling guide device, recessed portions are formed in the side surfaces of the track rail 40, and inclined surfaces 14 inclined slightly downward are formed in the side surfaces of the track rail 40. The sliding contact pads 50a of the friction member 50 are in contact with the downwardly inclined surfaces 14. The pressing plates 52b of the fixing holder 51 press the sliding contact pads 50a from behind thereof toward the downwardly inclined surfaces 14, with the result that the sliding contact pads 50a are pressed against the side surfaces of the track rail 40.

Further, the pair of pressing plates 52b of the fixing holder 51 presses the pair of sliding contact pads 50a slightly upward with respect to the downwardly inclined surfaces 14 of the track rail 40, and hence the pressure receiving plate 50b of the friction member 50 is pressed by the base plate 52a of the fixing holder 51 against the track rail 40 with a reaction force of the sliding contact pads 50a. That is, in the illustrated embodiment, the pair of sliding contact pads 50a and the pressure receiving plate 50b of the friction member 50 are pressed against the track rail 40 from three directions, causing the pressure receiving plate 50b to function also as a sliding contact pad to exert a frictional force.

Therefore, when the moving block 43 moves along the track rail 40, a frictional force acting between the damping member 5 and the track rail 40 acts as a resistance force to hold back the movement of the moving block 43. That is, in a state in which the moving block 43 is at a stop with respect to the track rail 40, the damping member 5 applies static stiffness in the longitudinal direction of the track rail 40 to the rolling guide device. In a state in which the moving block 43 is in motion with respect to the track rail 40, the damping member 5 converts kinetic energy of the moving block 43 to thermal energy for consumption.

A magnitude of the frictional force acting between the friction member 50 of the damping member 5 and the track rail 40 can be suitably set by changing a material of the friction member 50, a contact area between the sliding contact pads 50a and the pressure receiving plate 50b, and the track rail 40, and a spring force of the pressing plate 52b of the fixing holder 51. Therefore, the damping member of the present invention may suitably have a damping force required depending on an application of the rolling guide device.

Then, with a simple operation of mounting the friction member 50 and the fixing holder 51 to the track rail 40 and thereafter pushing the fixing holder 51 toward the moving block 43, the damping member 5 of the present invention can be integrated with the moving block 43. Therefore, the damping member 5 of the present invention can be mounted to the moving block 43 while a movable body such as a table is being fixed to the moving block 43, and the damping member can be easily added to the rolling guide device already in use.

Further, as is apparent from FIG. 8, the damping member 5 of the present invention is provided to overlap in a movement path of the moving block 43 with respect to the track rail 40, and an additional space is not required around the rolling guide device. Also on this point, the damping member 5 can also be easily added to the rolling guide device already in use.

In the illustrated embodiment, description is made of the example in which the track rail 40 is pressed by the friction member 50 from the three directions. However, the present invention is not limited thereto. The track rail 40 may be pressed by the friction member 50 from any one of directions.

In a case in which the rolling guide device of FIG. 4 is used for the cross guide section 4 of the seismic isolation device 1 illustrated in FIG. 1 to FIG. 3, when the upper table 3 vibrates in the X-direction and the Y-direction with respect to the lower table 2, friction resistance is generated between the friction member 50 of the damping member 5, and the first track rail 40 or the second track rail 41, the friction resistance acts as a force to press so as to stop the movement of the upper table 3 relative to the lower table 2. With this action, the vibration of the upper table 3 relative to the lower table 2 is damped.

That is, when the upper table 3 vibrates relative to the lower table 2, the vibration is damped by the damping member 5 which is mounted to each of the first moving block 43 and the second moving block 44. As the vibration acting from the floor to the lower table 2 is stopped, the vibration of the upper table 3 with respect to the lower table 2 can be stopped in an early stage.

The damping member 5 exerts the force to press so as to stop the movement of the upper table 3 with respect to the lower table 2, and hence the damping member 5 exerts the function to increase the static stiffness of the upper table 3 with respect to the lower table 2. Therefore, the static stiffness of the seismic isolation device 1 can be suitably set by changing the friction member 50 or a coefficient of spring of the holding portion 52, and a disadvantage, resulting in displacement of the upper table 3 relative to the lower table 2 when only a slight force is exerted, can be overcome.

Further, as described above, the damping member 5 can be mounted without the need for an additional space around the rolling guide device. Moreover, as long as the friction member 50 and the fixing holder 51 are mounted to the track rail, the damping member 5 can be easily coupled to the moving block for start to use. Therefore, the damping member 5 can be easily added to the existing seismic isolation device 1 which does not have a damping element against input vibration, or is short of a damping force, and hence the upper table 3 can be prevented from vibrating at a maximum amplitude with respect to the lower table 2 against input of excessive vibration, and a behavior of the upper table 3 can be appropriately controlled.

The invention claimed is:

1. A damping member for a rolling guide device, the rolling guide device including:
   a track rail; and
   a moving block, which is assembled to the track rail through intermediation of a plurality of rolling elements, and is configured to move along the track rail, the damping member comprising:
   a friction member which includes a sliding contact pad in contact with at least the track rail; and
   a fixing holder, which is configured to press the friction member against the track rail and couple the friction member to the moving block,
   the damping member being provided to the track rail in series with the moving block,
   wherein the fixing holder includes:
      a holding portion which includes a pressing plate configured to press the sliding contact pad against the track rail and cover the track rail from above the friction member; and
      a pair of coupling arms which extends from the holding portion along a longitudinal direction of the track rail to hold the moving block, and
   wherein the friction member includes a thick portion positioned between the holding portion of the fixing holder and the moving block, and
   wherein, in movement of the moving block along the track rail, any one of the moving block and the fixing holder presses the thick portion of the friction member in the longitudinal direction of the track rail.

2. The damping member for a rolling guide device according to claim 1, wherein the pair of coupling arms of the fixing holder has flexibility, and a locking claw, which is caught on an end surface of the moving block, is provided at a distal end of each coupling arm.

3. The damping member for a rolling guide device according to claim 2,
   wherein the friction member includes:
      a pair of sliding contact pads in contact with both side surfaces of the track rail; and
      a pressure receiving plate in contact with an upper surface of the track rail, and
   wherein the track rail is pressed by the pair of sliding contact pads and the pressure receiving plate from three directions.

4. A seismic isolation device, comprising:
   a lower table mounted to a fixing portion;
   an upper table having a seismic isolation object placed thereon;
   a first track rail provided to the lower table so as to extend along an X-direction;
   a second track rail provided to the upper table so as to extend along a Y-direction orthogonal to the X-direction;
   a composite guide member assembled to the first track rail and the second track rail through intermediation of a plurality of rolling elements; and
   a pair of damping members provided to the first track rails and the second track rails in series with the composite guide members,
   wherein each damping member includes:
      a friction member which includes a sliding contact pad in contact with at least one of the first track rail and the second track rail; and a fixing holder, which is configured to press the friction member against the first track rail or the second track rail and couple the friction member to the composite guide member, and is provided to the first track rail or the second track rail in series with the composite guide member, wherein the fixing holder includes:
a holding portion which includes a pressing plate configured to press the sliding contact pad against the first track rail or the second track rail and cover the track rail from above the friction member; and
a pair of coupling arms which extends from the holding portion along a longitudinal direction of the first track rail or the second tack rail to hold the composite guide member, and wherein the friction member includes a thick portion positioned between the holding portion of the fixing holder and the composite guide member, and wherein, in movement of the composite guide member along the first track rail or the second track rail, any one of the composite guide member and the fixing holder presses the thick portion of the friction member in the longitudinal direction of the first track rail or the second track rail.

\* \* \* \* \*